United States Patent
Ono

(10) Patent No.: US 10,266,764 B2
(45) Date of Patent: Apr. 23, 2019

(54) CORE SHELL PARTICLE, METHOD OF PRODUCING CORE SHELL PARTICLE, AND FILM

(71) Applicant: FUJIFILM Corporation, Tokyo (JP)

(72) Inventor: Masashi Ono, Ashigara-kami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/806,773

(22) Filed: Nov. 8, 2017

(65) Prior Publication Data

US 2018/0066184 A1 Mar. 8, 2018

Related U.S. Application Data

(63) Continuation of application No. PCT/JP2016/063757, filed on May 9, 2016.

(30) Foreign Application Priority Data

May 15, 2015 (JP) ................................. 2015-099642

(51) Int. Cl.
| | | |
|---|---|---|
| C09K 11/70 | (2006.01) | |
| C01B 25/08 | (2006.01) | |
| C01G 15/00 | (2006.01) | |
| C09K 11/02 | (2006.01) | |
| B82Y 20/00 | (2011.01) | |
| B82Y 40/00 | (2011.01) | |

(52) U.S. Cl.
CPC ............ *C09K 11/703* (2013.01); *C01B 25/08* (2013.01); *C01G 15/00* (2013.01); *C09K 11/02* (2013.01); *B82Y 20/00* (2013.01); *B82Y 40/00* (2013.01); *Y10S 977/774* (2013.01); *Y10S 977/818* (2013.01); *Y10S 977/824* (2013.01); *Y10S 977/892* (2013.01); *Y10S 977/896* (2013.01); *Y10S 977/95* (2013.01)

(58) Field of Classification Search
CPC ....... C09K 11/70; C09K 11/703; C09K 11/02; C01B 25/08; C01G 15/00
USPC .................................................. 252/301.6 S
See application file for complete search history.

(56) References Cited

U.S. PATENT DOCUMENTS

| | | |
|---|---|---|
| 2008/0199381 A1 | 8/2008 | Tokumitsu |
| 2009/0053522 A1 | 2/2009 | Sekiguchi et al. |
| 2009/0230382 A1 | 9/2009 | Banin et al. |
| 2010/0163798 A1 | 7/2010 | Ryowa et al. |
| 2011/0272668 A1 | 11/2011 | Taylor et al. |
| 2014/0158937 A1 | 6/2014 | Jang et al. |

FOREIGN PATENT DOCUMENTS

| | | |
|---|---|---|
| JP | 2008-544013 A | 12/2008 |
| JP | 2010-155872 A | 7/2010 |
| JP | 5137825 B2 | 2/2013 |
| WO | WO 2006/076290 A1 | 7/2006 |
| WO | WO 2007/086188 A1 | 8/2007 |

OTHER PUBLICATIONS

Aharoni et al., "Synthesis of InAs/CdSe/ZnSe Core/Shell1/Shell2 Structures with Bright and Stable Near-Infrared Fluorescence," Journal of the American Chemical Society, vol. 128, No. 1, 2006 (available on Web Dec. 7, 2005), pp. 257-264.
International Preliminary Report and Written Opinion of the International Searching Authority (Forms PCT/IB/326, PCT/IB/373 and PCT/ISA/237) issued in International Application No. PCT/JP2016/063757 dated Nov. 30, 2017, together with an English translation of the Written Opinion.
International Search Report (Form PCT/ISA/210) issued in International Application No. PCT/JP2016/063757 dated Jul. 26, 2016, together with an English translation.
Kim et al., "Highly Luminescent InP/GaP/ZnS Nanocrystals and Their Application to White Light-Emitting Diodes," Journal of the American Chemical Society, vol. 134, Feb. 3, 2012, pp. 3804-3809.
Kim et al., "Highly luminescing multi-shell semiconductor nanocrystals InP/ZnSe/ZnS," Applied Physics Letters, vol. 101, 2012 (Published Online Aug. 14, 2012), pp. 073107-1 through 073107-3 (5 pages total).
Murray et al., "Synthesis and Characterization of Nearly Monodisperse CdE (E=S, Se, Te) Semiconductor Nanocrystallites," Journal of the American Chemical Society, vol. 115, No. 19, 1993, pp. 8706-8715.
Virieux et al., "InP/ZnS Nanocrystals: Coupling NMR and XPS for Fine Surface and Interface Description," Journal of the American Chemical Society, vol. 134, Nov. 6, 2012, pp. 19701-19708.
Xu et al., "Rapid synthesis of highly luminescent InP and InP/ZnS nanocrystals," Journal of Materials Chemistry, vol. 18, No. 23, Jun. 21, 2008 (first published as an Advance Article on the web May 16, 2008), pp. 2653-2656 (6 pages total).
Extended European Search Report for corresponding European Application No. 16796326.3, dated May 24, 2018.

*Primary Examiner* — Edward M Johnson
(74) *Attorney, Agent, or Firm* — Birch, Stewart, Kolasch & Birch, LLP

(57) ABSTRACT

An object of the present invention is to provide core shell particle having high luminous efficacy and a narrow luminous half-width; a method of producing the same, and a film obtained by using core shell particles. The core shell particle of the present invention includes a core which contains a Group III element and a Group V element; a first shell which covers at least a part of a surface of the core; and a second shell which covers at least a part of the first shell. The molar ratio of the Group III element contained in the core to the Group V element contained in the entirety of the core shell particle, which is acquired from X-ray photoelectron spectroscopy analysis, is greater than 2.2.

23 Claims, No Drawings

10,266,764 B2

CORE SHELL PARTICLE, METHOD OF PRODUCING CORE SHELL PARTICLE, AND FILM

CROSS-REFERENCE TO RELATED APPLICATIONS

This application is a Continuation of PCT International Application No. PCT/JP2016/063757 filed on May 9, 2016, which claims priority under 35 U.S.C. § 119(a) to Japanese Patent Application No. 2015-099642 filed on May 15, 2015. The above application is hereby expressly incorporated by reference, in its entirety, into the present application.

BACKGROUND OF THE INVENTION

1. Field of the Invention

The present invention relates to a core shell particle, a method of producing the same, and a film containing a core shell particle.

2. Description of the Related Art

As semiconductor fine particles which are expected to be applied to colloidal semiconductor nanoparticles (so-called quantum dots), Group II-VI semiconductor fine particles or Group III-V semiconductor fine particles have been known.

The particle diameter of these semiconductor fine particles is several nanometers to several tens of nanometers.

Further, a band gap typically becomes larger as the particle diameter of particles having such a nanoscale decreases due to so-called quantum size effects, and the particles exhibit light emission in a short wavelength range such as an ultraviolet region or a near ultraviolet region.

Therefore, in order to use optical characteristics specific to the semiconductor fine particles, applications to various devices such as a piezoelectric element, an electronic device, a light-emitting element, and a laser have been researched and developed.

After suggestion of a hot soap method (also referred to as a hot injection method) which is a chemical synthesis method of quantum dots in "Synthesis and Characterization of Nearly Monodisperse CdE (E=S, Se, Te) Semiconductor Nanocrystallites" J. Am. Chem. Soc., written by C. B. Murray et al., No. 115, pp. 8706 to 8715 (1993), the research of quantum dots has been actively performed around the world.

Further, the examination of the quantum dots was performed mainly on a Group II-VI semiconductor containing a Cd element or a Pb element at the time of initial research, but the research of quantum dots which do not contain a Cd element or a Pb element has been recently suggested since the Cd element and the Pb element are substances regulated as Restriction on Hazardous Substances (Rohs) or the like (for example, JP5137825B and "Highly Luminescent InP/GaP/ZnS Nanocrystals and Their Application to White Light-Emitting Diodes" Journal of the American Chemical Society 134, written by S. Kim et al., 3804-3809 (2012).

SUMMARY OF THE INVENTION

As the result of examination performed, by the present inventors, on core shell particles having a multilayer shell layer described in "JP5137825B and "Highly Luminescent InP/GaP/ZnS Nanocrystals and Their Application to White Light-Emitting Diodes" Journal of the American Chemical Society 134, written by S. Kim et al., 3804-3809 (2012), it was found that establishment of synthesis conditions (for example, reaction raw materials, the reaction temperature, the reaction time, and the like) has not been promoted and the luminous efficacy or the luminous half-width greatly varies depending on the synthesis conditions.

Accordingly, an object of the present invention is to provide a core shell particle having high luminous efficacy and a narrow luminous half-width, a method of producing the same, and a film obtained by using a core shell particle.

As a result of intensive examination conducted by the present inventors in order to achieve the above-described object, in a core shell particle including: a core which contains a Group III element and a Group V element; a first shell which covers at least a part of the surface of the core; and a second shell which covers at least a part of the first shell, it was found that the luminous efficacy is increased and the luminous half-width is narrowed by setting the molar ratio of the Group III element contained in the core to the Group V element contained in the entirety of the core shell particle, which is acquired using X-ray photoelectron spectroscopy analysis, to greater than 2.2.

In other words, it was found that the above-described object can be achieved by the following configurations.

[1] A core shell particle comprising: a core which contains a Group III element and a Group V element; a first shell which covers at least a part of a surface of the core; and a second shell which covers at least a part of the first shell, in which the molar ratio of the Group III element contained in the core to the Group V element contained in the entirety of the core shell particle, which is acquired using X-ray photoelectron spectroscopy analysis, is greater than 2.2.

[2] The core shell particle according to [1], in which the molar ratio of the Group III element contained in the core to the group V element contained in the entirety of the core shell particle, which is acquired using X-ray photoelectron spectroscopy analysis is 2.5 to 5.0.

[3] The core shell particle according to [1], in which the molar ratio of the Group III element contained in the core to the group V element contained in the entirety of the core shell particle, which is acquired using X-ray photoelectron spectroscopy analysis is 3.0 to 5.0.

[4] The core shell particle according to any one of [1] to [3], in which the Group III element contained in the core is In, and the group V element contained in the core is any of P, N, and As.

[5] The core shell particle according to [4], in which the Group III element contained in the core is In, and the Group V element contained in the core is P.

[6] The core shell particle according to any one of [1] to [5], in which the core further contains a Group II element.

[7] The core shell particle according to [6], in which the Group II element contained in the core is Zn.

[8] The core shell particle according to any one of [1] to [7], in which the first shell contains a Group II element or a Group III element, where, in a case where the first shell contains a Group III element, the Group III element contained in the first shell is a Group III element different from the Group III element contained in the core.

[9] The core shell particle according to any one of [1] to [8], in which the first shell is a Group II-VI semiconductor which contains a Group II element and a Group VI element or a Group III-V semiconductor which contains a Group III element and a Group V element, where, in a case where the first shell is the Group III-V semiconductor, the Group III element contained in the Group III-V semiconductor is a Group III element different from the Group III element contained in the core.

[10] The core shell particle according to [9], in which, in a case where the first shell is the Group II-VI semiconductor, the Group II element is Zn and the Group VI element is Se or S, and in a case where the first shell is the Group III-V semiconductor, the Group III element is Ga and the Group V element is P.

[11] The core shell particle according to [9], in which the first shell is the Group III-V semiconductor, the Group III element is Ga, and the Group V element is P.

[12] The core shell particle according to any one of [1] to [11], in which the second shell is a Group II-VI semiconductor which contains a Group II element and a Group VI element or a Group III-V semiconductor which contains a Group III element and a Group V element.

[13] The core shell particle according to [12], in which the second shell is the Group II-VI semiconductor, the Group II element is Zn, and the Group VI element is S.

[14] The core shell particle according to any one of [1] to [13], in which the core, the first shell, and the second shell are respectively a crystal system having a zinc blende structure.

[15] The core shell particle according to any one of [1] to [14], in which, among the core, the first shell, and the second shell, a band gap of the core is the smallest, and the core and the first shell respectively have a type 1 band structure.

[16] A method of producing a core shell particle for synthesizing the core shell particle according to any one of [1] to [15], the method comprising: a first step of heating and stirring a solution obtained by adding a Group III raw material which contains a Group III element to a solvent containing coordination molecules; a second step of forming a core by adding a Group V raw material which contains a Group V element to the solution after the first step; a third step of forming a first shell by adding a raw material of the first shell to the solution after the second step; and a fourth step of synthesizing a core shell particle by adding a raw material of a second shell to the solution after the third step and by forming the second shell, in which the molar ratio of the Group V raw material added in the second step to the Group III raw material added in the first step is smaller than 0.5.

[17] The method of producing a core shell particle according to [16], in which the molar ratio of the Group V raw material added in the second step to the Group III raw material added in the first step is smaller than 0.4.

[18] The method of producing a core shell particle according to [16] or [17], in which the Group III raw material is a compound containing In.

[19] The method of producing a core shell particle according to any one of [16] to [18], in which the Group V raw material is a compound containing P.

[20] The method of producing a core shell particle according to any one of [16] to [19], in which the raw material of the first shell is a compound containing Ga.

[21] The method of producing a core shell particle according to [20], in which the raw material of the first shell is a chloride of Ga.

[22] The method of producing a core shell particle according to any one of [16] to [21], in which the raw material of the second shell is a compound containing Zn.

[23] A film which contains the core shell particle according to any one of [1] to [15].

According to the present invention, it is possible to provide a core shell particle having high luminous efficacy and a narrow luminous half-width, a method of producing the same, and a film obtained by using a core shell particle.

DESCRIPTION OF THE PREFERRED EMBODIMENTS

Hereinafter, the present invention will be described in detail.

The description of constituent elements below will be occasionally made based on representative embodiments of the present invention, but the present invention is not limited to these embodiments.

In the present specification, the numerical ranges expressed using "to" in the present specification indicate the ranges including the numerical values described before and after "to" as the lower limits and the upper limits.

[Core Shell Particle]

A Core shell particle of the present invention includes a core which contains a Group III element and a Group V element; a first shell which covers at least a part of the surface of the core; and a second shell which covers at least a part of the first shell.

Further, the core shell particle of the present invention is a core shell particle in which the molar ratio of the Group III element contained in the core to the Group V element contained in the entirety of the core shell particle [hereinafter, also referred to as the "molar ratio (Group III/Group V)], which is acquired using X-ray photoelectron spectroscopy (hereinafter, also referred to "XPS")] analysis, is greater than 2.2.

Here, the molar ratio is acquired in the following manner.

The molar ratio thereof is acquired by measuring the XPS of the core shell particle and correcting the ratio of the peak intensity of the Group III element contained in the core to the peak intensity of the Group V element contained in the entirety of the core shell particle with a relative sensitivity coefficient for each element. The relative sensitivity coefficient is acquired by measuring measurement elements (measurement trajectory) to be described later related to standard samples whose compositions have been known (Journal of Surface Analysis Vol. 12 No. 3, pp. 357 (2005)).

Further, the peak intensity indicates the area intensity obtained by subtracting the background from the peak observed under the following measurement conditions and integrating the area of the peak with respect to the energy.

Further, the XPS measurement is performed by using a sample obtained by coating a non-doped Si substrate with a dispersion liquid (solvent: toluene) containing core shell particles and drying the substrate.

<Measurement Conditions>

Measuring device: Quantera SXM type XPS (manufactured by ULVAC-PHI, Inc.)

X-ray source: Al-Kα ray (analytic diameter: 100 μm, 25 W, 15 kV)

Extraction angle of photoelectrons: 45° C.

Measurement range: 300 μm×300 μm

Correction: charging correction using combination of electron gun and low-speed ion gun Measurement elements (measurement trajectory): C (1s), N (1s), O (1s), Si (2p), P (2p), S (2p), Cl (2p), Zn (2p3/2), Ga (2p3/2), In (3d5/2)

The core shell particle of the present invention has a molar ratio (Group III/Group V) of greater than 2.2, and thus the luminous efficacy is increased and the luminous half-width is narrowed.

The reason why the luminous efficacy is increased and the luminous half-width is narrowed is not clear yet, but can be assumed as follows.

First, a large amount of metal cations derived from the Group III element are considered to be present on the surface of the core since the molar ratio (Group III/Group V) is greater than 2.2.

Therefore, during the synthesis of the core shell particle, the coordination molecules used in a first step described below are easily coordinated to the metal cations on the surface of the core. As the result, the formation of the first shell proceeds efficiently and defects of the interface between the core and the first shell can be reduced.

According to the present invention, from the viewpoint of further increasing the luminous efficacy, the molar ratio (Group III/Group V) is preferably in a range of 2.5 to 5.0, more preferably in a range of 3.0 to 5.0, still more preferably in a range of 3.0 to 4.0, particularly preferably in a range of 3.0 to 3.5, and most preferably greater than 3.0 and less than 3.5.

[Core]

The core contained in the core shell particle of the present invention is a so-called Group III-V semiconductor that contains a Group III element and a Group V element.

<Group III Element>

Specific examples of the Group III element include indium (In), aluminum (Al), and gallium (Ga). Among these, In is preferable.

<Group V Element>

Specific examples of the Group V element include phosphorus (P), nitrogen (N), and arsenic (As). Among these, P is preferable.

In the present invention, a Group III-V semiconductor obtained by appropriately combining the Group III element and the Group V element exemplified above can be used as the core, but InP, InN, or InAs is preferable from the viewpoint that the luminous efficacy is further increased, the luminous half-width is narrowed, and a clear exciton peak is obtained. Among these, from the viewpoint of further increasing the luminous efficacy, InP is more preferable.

In the present invention, it is preferable that the core further contains a Group II element in addition to the Group III element and the Group V element described above. Particularly in a case where the core is InP, the lattice constant is decreased by doping Zn as the Group II element and the lattice matching performance with a shell (for example, GaP, ZnS, or the like described below) having a smaller lattice constant than that of InP becomes excellent.

[First Shell]

The first shell contained in the core shell particle of the present invention is a material that covers at least a part of the surface of the core.

Here, in the present invention, it is possible to confirm whether at least a part of the surface of the core is covered with the first shell based on composition distribution analysis according to energy dispersive X-ray spectroscopy (TEM-EDX) using a transmission electron microscope.

In the present invention, from the viewpoint of easily suppressing defects of the interface between the core and the first shell, it is preferable that the first shell contains a Group II element or a Group III element.

Here, in a case where the first shell contains a Group III element, the Group III element contained in the first shell is a Group III element different from the Group III element contained in the core described above.

Further, in addition to a Group II-VI semiconductor and a Group III-V semiconductor described below, a Group III-VI semiconductor (such as $Ga_2O_3$, $Ga_2S_3$, or the like) containing a Group III element and a Group VI element is exemplified as the first shell containing a Group II element or a Group III element.

In the present invention, from the viewpoint of obtaining an excellent crystal phase with less defects, it is preferable that the first shell is a Group II-VI semiconductor containing a Group II element and a Group VI element or a Group III-V semiconductor containing a Group III element and a Group V element and more preferable that the first shell is a Group III-V semiconductor in which a difference in lattice constant between the core described above and the first shell is small.

Here, in a case where the first shell is a Group III-V semiconductor, the Group III element contained in the Group III-V semiconductor is a Group III element different from the Group III element contained in the core described above.

<Group II-VI Semiconductor>

Specific examples of the Group II element contained in the Group II-VI semiconductor include zinc (Zn), cadmium (Cd), and magnesium (Mg). Among these, Zn is preferable.

Further, specific examples of the Group VI element contained in the Group II-VI semiconductor include sulfur (S), oxygen (O), selenium (Se), and tellurium (Te). Among these, S or Se is preferable and S is more preferable.

A Group II-VI semiconductor obtained by appropriately combining the Group II element and the Group VI element described above can be used as the first shell, but it is preferable that the first shell is a crystal system (for example, a zinc blende structure) which is the same as or similar to the core described above. Specifically, ZnSe, ZnS, or a mixed crystal of these is preferable and ZnSe is more preferable.

<Group III-V Semiconductor>

Specific examples of the Group III element contained in the Group III-V semiconductor include indium (In), aluminum (Al), and gallium (Ga). Among these, Ga is preferable. As described above, the Group III element contained in the Group III-V semiconductor is a Group III element different from the Group III element contained in the core described above. For example, in a case where the Group III element contained in the core is In, the Group III element contained in the Group III-V semiconductor is Al, Ga, or the like.

Further, specific examples of the Group V element contained in the Group III-V semiconductor include phosphorus (P), nitrogen (N), and arsenic (As). Among these, P is preferable.

A Group III-V semiconductor obtained by appropriately combining the Group III element and the Group V element described above can be used as the first shell, but it is preferable that the first shell is a crystal system (for example, a zinc blende structure) which is the same as or similar to the core described above. Specifically, GaP is preferable.

In the present invention, from the viewpoint of reducing defects of the surface of the core shell particle to be obtained, it is preferable that a difference in lattice constant between the above-described core and the first shell is small. Specifically, it is preferable that the difference in lattice constant between the above-described core and the first shell is 10% or less.

Specifically, in a case where the above-described core is InP, it is preferable that the first shell is ZnSe (difference in lattice constant: 3.4%) or GaP (difference in lattice constant: 7.1%) as described above. Particularly, it is more preferable that the first shell is the same Group III-V semiconductor as the core and the Group III-V semiconductor is GaP from the viewpoint that a mixed crystal state can be easily made on the interface between the core and the first shell.

In the present invention, in a case where the first shell is a Group III-V semiconductor, the first shell may contain or dope another element (for example, the Group II element or the Group VI element described above) within the range that does not affect the magnitude correlation (core<first shell) of the band gap between the core and the first shell. Similarly, in a case where the first shell is a Group II-VI semiconductor, the first shell may contain or dope another element (for example, the Group III element or the Group V element described above) within the range that does not affect the magnitude correlation (core<first shell) of the band gap between the core and the first shell.

[Second Shell]

The second shell contained in the core shell particle of the present invention is a material that covers at least a part of the surface of the first shell described above.

Here, in the present invention, it is possible to confirm whether at least a part of the surface of the first shell is covered with the second shell based on composition distribution analysis according to energy dispersive X-ray spectroscopy (TEM-EDX) using a transmission electron microscope.

In the present invention, from the viewpoints of suppressing defects of the interface between the first shell and the second shell and obtaining an excellent crystal phase with less defects, it is preferable that the second shell is a Group II-VI semiconductor containing a Group II element and a Group VI element or a Group III-V semiconductor containing a Group III element and a Group V element. Further, from the viewpoints of high reactivity of the material itself and easily obtaining a shell with excellent crystallinity, it is more preferable that the second shell is a Group II-VI semiconductor.

Examples of the Group II element, the Group VI element, the Group III element, and the Group V element include those described in the section of the first shell.

A Group II-VI semiconductor obtained by appropriately combining the Group II element and the Group VI element described above can be used as the second shell, but it is preferable that the second shell is a crystal system (for example, a zinc blende structure) which is the same as or similar to the core described above. Specifically, ZnSe, ZnS, or a mixed crystal of these is preferable and ZnS is more preferable.

A Group III-V semiconductor obtained by appropriately combining the Group III element and the Group V element described above can be used as the second shell, but it is preferable that the second shell is a crystal system (for example, a zinc blende structure) which is the same as or similar to the core described above. Specifically, GaP is preferable.

In the present invention, from the viewpoint of reducing defects of the surface of the core shell particle to be obtained, it is preferable that a difference in lattice constant between the above-described first shell and the second shell is small. Specifically, it is preferable that the difference in lattice constant between the above-described first shell and the second shell is 10% or less.

Specifically, in a case where the above-described first shell is GaP, it is preferable that the second shell is ZnSe (difference in lattice constant: 3.8%) or ZnS (difference in lattice constant: 0.8%) as described above and more preferable that the second shell is ZnS.

In the present invention, in a case where the second shell is a Group II-VI semiconductor, the second shell may contain or dope another element (for example, the Group III element or the Group V element described above) within the range that does not affect the magnitude correlation (core<second shell) of the band gap between the core and the second shell. Similarly, in a case where the second shell is a Group III-V semiconductor, the second shell may contain or dope another element (for example, the Group II element or the Group VI element described above) within the range that does not affect the magnitude correlation (core<second shell) of the band gap between the core and the second shell.

In the present invention, from the viewpoint that epitaxial growth becomes easy and defects of an interface between layers are easily suppressed, it is preferable that each of the core, the first shell, and the second shell described above is a crystal system having a zinc blende structure.

In the present invention, from the viewpoint that the probability of excitors staying in the core becomes higher and the luminous efficacy is further increased, it is preferable that the band gap of the core from among the core, the first shell, and the second shell is the smallest and the core and the first shell are core shell particles having a type 1 (type I) band structure.

[Coordination Molecule]

From the viewpoint of imparting dispersibility, it is desirable that the surface of the core shell particle of the present invention has coordination molecules.

From the viewpoint of dispersibility in a solvent, it is preferable that the coordination molecules contain aliphatic hydrocarbon.

Further, from the viewpoint of improving the dispersibility, a coordination molecule is preferably a ligand in which the number of carbon atoms in the main chain is at least 6 and more preferably a ligand in which the number of carbon atoms in the main chain is 10 or greater.

The coordination molecule may be a saturated compound or an unsaturated compound, and specific examples thereof include decanoic acid, lauric acid, myristic acid, palmitic acid, stearic acid, behenic acid, oleic acid, erucic acid, oleylamine, dodecylamine, dodecanethiol, 1,2-hexadecanethiol, trioctylphosphine oxide, and cetrimonium bromide, and these may be used alone or in combination of two or more kinds thereof.

[Average Particle Diameter]

From the viewpoints of easily synthesizing particles having a uniform size and easily controlling the emission wavelength using quantum size effects, the average particle diameter of the core shell particles of the present invention is preferably 2 nm or greater and more preferably 10 nm or less.

Here, the average particle diameter is a value obtained by directly observing at least 20 particles using a transmission electron microscope, calculating the diameters of circles having the same area as the projected area of the particles, and arithmetically averaging these values.

[Method of Producing Core Shell Particles]

A method of producing a core shell particle for synthesizing the core shell particle according to the present invention described above (hereinafter, also referred to as the "production method of the present invention") includes a first step of heating and stirring a solution obtained by adding a Group III raw material which contains a Group III element to a solvent containing coordination molecules; a second step of forming a core by adding a Group V raw material which contains a Group V element to the solution after the first step; a third step of forming a first shell by adding a raw material of the first shell to the solution after the second step; and a fourth step of synthesizing core shell particle by adding a raw material of a second shell to the solution after the third step to form the second shell, in which the molar ratio of the Group V raw material added in the second step to the Group III raw material added in the first step is smaller than 0.5.

Here, examples of the Group III element and the Group V element are the same as those described in the section of the core shell particle of the present invention described above.

Hereinafter, raw materials and conditions of each treatment step will be described in detail.

[First Step]

The first step is a step of heating and stirring a solution obtained by adding a Group III raw material which contains a Group III element to a solvent containing coordination molecules.

<Coordination Molecule>

Examples of the coordination molecule used in the first step are the same as those described in the section of the core shell particle of the present invention described above. Among those, from the viewpoints of promoting the synthesis of the core and having an appropriate coordination force with respect to the core, oleic acid, palmitic acid, and stearic acid are preferable.

<Solvent>

Preferred examples of the solvent used in the first step include non-polar solvents having a boiling point of 170° C. or higher.

Examples of the non-polar solvents include aliphatic saturated hydrocarbon such as n-decane, n-dodecane, n-hexadecane, or n-octadecane; aliphatic unsaturated hydrocarbon such as 1-undecene, 1-dodecene, 1-hexadecene, or 1-octadecene; trioctylphosphine.

Among these, aliphatic unsaturated hydrocarbon having 12 or greater carbon atoms is preferable and 1-octadecene is more preferable.

<Group III Raw Material>

Specific examples of the Group III raw material to be added to the solvent containing the coordination molecule described above include indium chloride, indium oxide, indium nitrate, indium sulfate, indium acid; aluminum phosphate, aluminum acetylacetonate, aluminum chloride, aluminum fluoride, aluminum oxide, aluminum nitrate, aluminum sulfate; gallium acetylacetonate, gallium chloride, gallium fluoride, gallium oxide, gallium nitrate, and gallium sulfate, and these may be used alone or in combination of two or more kinds thereof.

Among these, from the viewpoints of further improving the luminous efficacy and easily controlling the emission wavelength in a visible range, a compound containing In is preferable. Particularly, from the viewpoint that impurity ions such as a chloride ion are unlikely to be taken into the core and excellent crystallinity is easily realized, it is more preferable to use indium acetate.

<Group II Raw Material>

In the production method of the present invention, a Group II raw material containing a Group II element may be added together with the Group III raw material described above during the first step.

Specific examples of the Group II raw material including a Group II element include dimethyl zinc, diethyl zinc, zinc carboxylate, zinc acetylacetonate, zinc iodide, zinc bromide, zinc chloride, zinc fluoride, zinc carbonate, zinc cyanide, zinc nitrate, zinc oxide, zinc peroxide, zinc perchlorate, zinc acetate, and zinc sulfate.

Among these, from the viewpoints that impurities such as a chloride ion are not contained and the compatibility with the coordination molecule described above and the solubility in a solvent are relatively high, it is preferable to use zinc acetate, which is an acetate of Zn.

<Conditions for Heating and Stirring>

In the first step, it is preferable that the coordination molecules and the Group III raw material described above are dissolved in the solvent and also preferable that the coordination molecules and the Group III raw material are dissolved in the solvent by heating and stirring the solution in a temperature range of 100° C. to 180° C. At this time, it is preferable that dissolved oxygen or moisture is removed from the mixed solution, in which the coordination molecules and the Group III raw material have been dissolved, by heating the solution under reduced pressure.

Further, the time required for heating and dissolving is preferably 30 minutes or longer.

[Second Step]

The second step is a step of forming a core by adding a Group V raw material which contains a Group V element to the solution after the first step.

In the production method of the present invention, since the molar ratio of the Group V raw material added in the second step to the Group III raw material added in the first step is smaller than 0.5, the core shell particle in which the molar ratio of the Group III element contained in the core to the Group V element contained in the entirety of the core shell particle, which is acquired from X-ray photoelectron spectroscopy analysis, is greater than 2.2 are obtained.

Further, the molar ratio indicates a molar ratio of the Group V raw material added in the second step to the Group III raw material added in the first step even in a case where a part of the Group V raw material added in the second step is used as the raw material of the first shell during the third step.

From the viewpoint that a larger amount of metal cations derived from the Group III element can be present on the surface of the core, the molar ratio of the Group V raw material added in the second step to the Group III raw material added in the first step is preferably smaller than 0.4 and more preferably in a range of 0.38 to 0.25.

<Group V Raw Material>

Specific examples of the Group V raw material containing a Group V element include tristrialkylsilylphosphine, trisdialkylsilylphosphine, trisdialkylaminophosphine; arsenic oxide, arsenic chloride, arsenic sulfate, arsenic bromide, arsenic iodide; nitric oxide, nitric acid, and ammonium nitrate.

Among these, a compound containing P is preferable. As the compound, it is preferable to use tristrialkylsilylphosphine or trisdialkylaminophosphine. Specifically, it is more preferable to use tristrimethylsilylphosphine.

[Third Step]

The third step is a step of forming a first shell by adding a raw material of the first shell to the solution after the second step.

Here, as the raw material of the first shell, a Group II raw material containing the Group II element described above and a Group VI raw material containing the Group VI element described below are exemplified in a case where the first shell is the Group II-VI semiconductor; and a Group III raw material containing the Group III element described above and a Group V raw material containing the Group V element described above are exemplified in a case where the first shell is the Group III-V semiconductor described above.

Here, in a case where the first shell is the Group III-V semiconductor described above, the Group III element contained in the Group III-V semiconductor is a Group III element different from the Group III element contained in the core as described in the section of the core shell particle of the present invention.

Further, in a case where the first shell is the Group III-V semiconductor described above, since the Group V raw material containing a Group V element is the same raw material as the Group V raw material forming the core, a part of the Group V raw material used in the second step may be used and only the Group III raw material may be added in the third step.

<Group VI Raw Material>

Specific examples of the Group VI raw material containing a Group VI element include sulfur, alkylthiol, trialkylphosphine sulfide, trialkenylphosphine sulfide, alkylamino sulfide, alkenylamino sulfide, cyclohexyl isothiocyanate, diethyl dithiocarbamic acid, trialkylphosphine selenium, trialkenylphosphine selenium, alkylamino selenium, alkenylamino selenium, trialkylphosphine telluride, trialkenylphosphine telluride, alkylamino telluride, and alkenylamino telluride.

Among these, from the viewpoint of excellent dispersibility of core shell particles to be obtained, it is preferable to use alkylthiol, specifically, more preferable to use dodecanethiol or octanethiol, and still more preferable to use dodecanethiol.

Among these materials, it is preferable to use the Group III raw material and the Group V raw material.

Particularly, as the Group III raw material, it is more preferable to use a compound containing Ga (such as gallium acetylacetonate, gallium chloride, gallium fluoride, gallium oxide, gallium nitrate, or gallium sulfate) and still more preferable to use a chloride of Ga.

In addition, as the Group V raw material, it is preferable to use a part of the Group V raw material used in the second step as described above.

[Fourth Step]

The fourth step is a step of synthesizing a core shell particle by adding a raw material of a second shell to the solution after the third step to form the second shell.

Here, as the raw material of the second shell, a Group II raw material containing the Group II element described above and a Group VI raw material containing the Group VI element described above are exemplified in a case where the second shell is the Group II-VI semiconductor; and a Group III raw material containing the Group III element described above and a Group V raw material containing the Group V element described above are exemplified in a case where the second shell is the Group III-V semiconductor described above.

Among these raw materials, it is preferable to use the Group II raw material and the Group VI raw material.

Particularly, it is preferable to use a compound containing Zn (particularly, a carboxylate of Zn) as the Group II raw material.

Further, it is preferable to use alkylthiol as the Group VI raw material.

[Film]

The film of the present invention is a film containing the core shell particle of the present invention described above.

Since such a film of the present invention has high luminous efficacy and a narrow luminous half-width and is useful as quantum dots, the film can be applied to a wavelength conversion film used for a display, a photoelectron conversion (or wavelength conversion) film of a solar cell, a biological label, a thin film transistor, and the like. Particularly, the film of the present invention is suitably applied to a down conversion film or a down shift type wavelength conversion film which absorbs light in a shorter wave region than that of the absorption edge of quantum dots and emits light having a long wave.

Further, the film material as a base material constituting the film of the present invention is not particularly limited and may be a resin or a thin glass film.

Specific examples thereof include resin materials mainly formed of an ionomer, polyethylene, polyvinyl chloride, polyvinylidene chloride, polyvinyl alcohol, polypropylene, polyester, polycarbonate, polystyrene, polyacrylonitrile, an ethylene vinyl acetate copolymer, an ethylene-vinyl alcohol copolymer, an ethylene-methacrylic acid copolymer film, and nylon.

EXAMPLES

Hereinafter, the present invention will be described in more detail based on examples. The materials, the use amounts, the ratios, the treatment contents, and the treatment procedures can be changed as appropriate within the range not departing from the gist of the present invention. Therefore, the scope of the present invention should not be limitatively interpreted by the following examples.

Example 1

32 mL of octadecene, 140 mg (0.48 mmol) of indium acetate, 48 mg (0.24 mmol) of zinc acetate, and 364 mg (1.44 mmol) of palmitic acid were added to a flask, heated and stirred at 110° C. in a vacuum, and degassed for 90 minutes while the raw materials were sufficiently dissolved.

Next, the flask was heated to 300° C. in a nitrogen flow, and 0.12 mmol of tristrimethylsilylphosphine dissolved in approximately 4 mL of octadecene was added to the flask when the temperature of the solution was stabilized. Thereafter, the flask was heated for 120 minutes in a state in which the temperature of the solution was set to 230° C. It was confirmed that the color of the solution was red and particles (core) were formed.

Next, 30 mg (0.18 mmol) of gallium chloride and 125 μL (0.4 mmol) of oleic acid which were dissolved in 8 mL of octadecene were added to the solution in a state in which the solution was heated to 200° C., and the solution was further heated for approximately 1 hour, thereby obtaining a dispersion liquid of a core shell particle precursor including InP (core) doped with Zn and GaP (first shell).

Next, the dispersion liquid was cooled to room temperature, 513 mg (2.8 mmol) of zinc acetate was added thereto, the dispersion liquid was heated to 230° C., and the temperature thereof was maintained for approximately 4 hours. Next, 2.67 mL (11.3 mmol) of dodecanethiol was added to the dispersion liquid and the dispersion liquid was heated to 240° C. The obtained dispersion liquid was cooled to room temperature, ethanol was added thereto, and centrifugation was performed on the dispersion liquid so that particles were precipitated. The supernatant was disposed and the resultant was dispersed in a toluene solvent.

In this manner, a toluene dispersion liquid of core shell particles including InP (core) doped with Zn, GaP (first shell) covering the surface of the core, and ZnS (second shell) covering the surface of the first shell was obtained.

Example 2

A toluene dispersion liquid of core shell particles including InP (core) doped with Zn, GaP (first shell) covering the surface of the core, and ZnS (second shell layer) covering the surface of the first shell was obtained by following the same procedures as those in Example 1 except that 0.18 mmol of tristrimethylsilylphosphine was added in place of 0.12 mmol of tristrimethylsilylphosphine.

Example 3

A toluene dispersion liquid of core shell particles including InP (core) doped with Zn, GaP (first shell) covering the surface of the core, and ZnS (second shell layer) covering the surface of the first shell was obtained by following the same procedures as those in Example 1 except that 0.20 mmol of tristrimethylsilylphosphine was added in place of 0.12 mmol of tristrimethylsilylphosphine.

Example 4

A toluene dispersion liquid of core shell particles including InP (core) doped with Zn, GaP (first shell) covering the surface of the core, and ZnS (second shell layer) covering the surface of the first shell was obtained by following the same procedures as those in Example 1 except that 0.22 mmol of tristrimethylsilylphosphine was added in place of 0.12 mmol of tristrimethylsilylphosphine.

Comparative Example 1

A toluene dispersion liquid of core shell particles including InP (core) doped with Zn, GaP (first shell) covering the surface of the core, and ZnS (second shell layer) covering the surface of the first shell was obtained by following the same procedures as those in Example 1 except that 0.24 mmol of tristrimethylsilylphosphine was added in place of 0.12 mmol of tristrimethylsilylphosphine.

Comparative Example 2

A toluene dispersion liquid of core shell particles including InP (core) doped with Zn, GaP (first shell) covering the surface of the core, and ZnS (second shell layer) covering the surface of the first shell was obtained by following the same procedures as those in Example 1 except that 0.32 mmol of tristrimethylsilylphosphine was added in place of 0.12 mmol of tristrimethylsilylphosphine.

Comparative Example 3

32 mL of octadecene, 140 mg (0.48 mmol) of indium acetate, 48 mg (0.24 mmol) of zinc acetate, and 364 mg (1.44 mmol) of palmitic acid were added to a flask, heated and stirred at 110° C. in a vacuum, and degassed for 90 minutes while the raw materials were sufficiently dissolved.

Next, the flask was heated to 300° C. in a nitrogen flow, and 0.18 mmol of tristrimethylsilylphosphine dissolved in approximately 4 mL of octadecene was added to the flask when the temperature of the solution was stabilized. Thereafter, the flask was heated for 120 minutes in a state in which the temperature of the solution was set to 230° C. It was confirmed that the color of the solution was red and particles (core) were formed.

Next, the solution was cooled to room temperature, 220 mg (1.2 mmol) of zinc acetate was added thereto, the solution was heated to 230° C., and the temperature thereof was maintained for approximately 4 hours. Next, 1.15 mL (4.85 mmol) of dodecanethiol was added to the solution and the solution was heated to 240° C. The obtained solution was cooled to room temperature, ethanol was added thereto, and centrifugation was performed on the solution so that particles were precipitated. The supernatant was disposed and the resultant was dispersed in a toluene solvent.

In this manner, a toluene dispersion liquid of core shell particles including InP (core) doped with Zn and ZnS (shell) covering the surface of the core was obtained.

<Molar Ratio (Group III/Group V)>

In the obtained core shell particles, the molar ratio [molar ratio (Group III/Group V)] of the Group III element contained in the core to the Group V element contained in the entirety of the core shell particles was acquired using XPS. The details of the method of acquiring the molar ratio (Group III/Group V) are as described above. The results are listed in Table 1.

<Luminous Efficacy>

The emission intensity of the obtained dispersion liquid of the core shell particles was measured using a fluorescence spectrophotometer FluoroMax-3 (manufactured by HORIBA Jobin Yvon) by adjusting the concentration thereof such that the absorbance at an excitation wavelength of 450 nm was set to 0.2. The luminous efficacy was calculated by performing comparison with a quantum dot sample whose luminous efficacy was known. The obtained luminous efficacy was calculated as a ratio of the number of emission photons to the number of absorption photons from excitation light. The results are listed in Table 1.

<Luminous Half-Width>

The half-width of the obtained dispersion liquid of the core shell particles was acquired by measuring the fluorescence spectrum using light having an excitation wavelength of 450 nm at room temperature. Specifically, each wavelength whose intensity was half the peak intensity of a fluorescence spectrum to be observed was acquired and the half-width was calculated from a difference in wavelength. The results are listed in Table 1.

TABLE 1

|  | Molar ratio (Group III/Group V) | Luminous efficacy (%) | Luminous half-width (nm) |
| --- | --- | --- | --- |
| Example 1 | 3.50 | 67.1 | 67 |
| Example 2 | 3.25 | 70.8 | 67 |
| Example 3 | 2.60 | 68.3 | 70 |
| Example 4 | 2.40 | 63.5 | 72 |
| Comparative Example 1 | 2.10 | 51.5 | 86 |
| Comparative Example 2 | 1.75 | 53.9 | 95 |
| Comparative Example 3 | 3.00 | 43.8 | 68 |

From the results listed in Table 1, it was understood that the luminous efficacy was decreased and the luminous half-width was increased in a case of the core shell particles in which the molar ratio (Group III/Group V) was 2.2 or less (Comparative Examples 1 and 2).

Further, it was understood that the luminous half-width was narrowed and the luminous efficacy was decreased in a case of the core shell particles in which the shell was formed of only one layer even when the molar ratio (Group III/Group V) was greater than 2.2 (Comparative Example 3).

Meanwhile, it was understood that the luminous efficacy was increased and the luminous half-width was narrowed in a case of the core shell particles including the core, the first shell, and the second shell even when the molar ratio (Group III/Group V) was greater than 2.2 (Examples 1 to 4).

Particularly, based on the comparison of Examples 1 to 3 with Example 4, it was understood that the luminous efficacy was increased in a case where the molar ratio (Group III/Group V) was in a range of 2.5 to 5.0.

Further, based on the comparison of Examples 1 and 2 with Example 3, it was understood that the luminous half-width was narrowed in a case where the molar ratio (Group III/Group V) was in a range of 3.0 to 5.0.

What is claimed is:

1. A core shell particle comprising:
a core which contains a Group III element and a Group V element;
a first shell which covers at least a part of a surface of the core; and
a second shell which covers at least a part of the first shell,
wherein the molar ratio of the Group III element contained in the core to the Group V element contained in the entirety of the core shell particle, which is acquired using X-ray photoelectron spectroscopy analysis, is greater than 2.2.

2. The core shell particle according to claim 1,
wherein the molar ratio of the Group III element contained in the core to the group V element contained in the entirety of the core shell particle, which is acquired using X-ray photoelectron spectroscopy analysis is 2.5 to 5.0.

3. The core shell particle according to claim 1,
wherein the molar ratio of the Group III element contained in the core to the group V element contained in the entirety of the core shell particle, which is acquired using X-ray photoelectron spectroscopy analysis is 3.0 to 5.0.

4. The core shell particle according to claim 1,
wherein the Group III element contained in the core is In, and
the group V element contained in the core is any of P, N, and As.

5. The core shell particle according to claim 4,
wherein the Group III element contained in the core is In, and
the Group V element contained in the core is P.

6. The core shell particle according to claim 1,
wherein the core further contains a Group II element.

7. The core shell particle according to claim 6,
wherein the Group II element contained in the core is Zn.

8. The core shell particle according to claim 1,
wherein the first shell contains a Group II element or a Group III element,
where, in a case where the first shell contains a Group III element, the Group III element contained in the first shell is a Group III element different from the Group III element contained in the core.

9. The core shell particle according to claim 1,
wherein the first shell is a Group II-VI semiconductor which contains a Group II element and a Group VI element or a Group III-V semiconductor which contains a Group III element and a Group V element,
where, in a case where the first shell is the Group III-V semiconductor, the Group III element contained in the Group III-V semiconductor is a Group III element different from the Group III element contained in the core.

10. The core shell particle according to claim 9,
Wherein, in a case where the first shell is the Group II-VI semiconductor, the Group II element is Zn and the Group VI element is Se or S, and
in a case where the first shell is the Group III-V semiconductor, the Group III element is Ga and the Group V element is P.

11. The core shell particle according to claim 9,
wherein the first shell is the Group III-V semiconductor, the Group III element is Ga, and the Group V element is P.

12. The core shell particle according to claim 1,
wherein the second shell is a Group II-VI semiconductor which contains a Group II element and a Group VI element or a Group III-V semiconductor which contains a Group III element and a Group V element.

13. The core shell particle according to claim 12,
wherein the second shell is the Group II-VI semiconductor,
the Group II element is Zn, and
the Group VI element is S.

14. The core shell particle according to claim 1,
wherein the core, the first shell, and the second shell are respectively a crystal system having a zinc blende structure.

15. The core shell particle according to claim 1,
wherein, among the core, the first shell, and the second shell, a band gap of the core is the smallest, and
the core and the first shell respectively have a type 1 band structure.

16. A method of producing a core shell particle for synthesizing the core shell particle according to claim 1, the method comprising:
a first step of heating and stirring a solution obtained by adding a Group III raw material which contains a Group III element to a solvent containing coordination molecules;
a second step of forming a core by adding a Group V raw material which contains a Group V element to the solution after the first step;
a third step of forming a first shell by adding a raw material of the first shell to the solution after the second step; and
a fourth step of synthesizing a core shell particle by adding a raw material of a second shell to the solution after the third step and by forming the second shell,
wherein the molar ratio of the Group V raw material added in the second step to the Group III raw material added in the first step is smaller than 0.5.

17. The method of producing a core shell particle according to claim 16,
wherein the molar ratio of the Group V raw material added in the second step to the Group III raw material added in the first step is smaller than 0.4.

18. The method of producing a core shell particle according to claim 16,
wherein the Group III raw material is a compound containing In.

19. The method of producing a core shell particle according to claim 16,
wherein the Group V raw material is a compound containing P.

20. The method of producing a core shell particle according to claim 16,
wherein the raw material of the first shell is a compound containing Ga.

21. The method of producing a core shell particle according to claim 20,
wherein the raw material of the first shell is a chloride of Ga.

22. The method of producing a core shell particle according to claim 16,
wherein the raw material of the second shell is a compound containing Zn.

23. A film which contains the core shell particle according to claim 1.

\* \* \* \* \*